US007151860B1

(12) United States Patent
Sakai et al.

(10) Patent No.: US 7,151,860 B1
(45) Date of Patent: Dec. 19, 2006

(54) DOCUMENT IMAGE CORRECTING DEVICE AND A CORRECTING METHOD

(75) Inventors: Kenichiro Sakai, Kanagawa (JP); Tsugio Noda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 09/612,288

(22) Filed: Jul. 7, 2000

(30) Foreign Application Priority Data

Jul. 30, 1999 (JP) ................................. 11-216050

(51) Int. Cl.
G06K 9/32 (2006.01)
(52) U.S. Cl. .................................................... 382/297
(58) Field of Classification Search ........ 382/289–297, 382/173, 190, 181, 195, 199, 180–189; 358/1.18, 358/1.11–1.12, 296
See application file for complete search history.

(56) References Cited

U.S. PATENT DOCUMENTS

| | | | | | |
|---|---|---|---|---|---|
| 4,837,845 | A | * | 6/1989 | Pruett et al. ................. | 382/297 |
| 5,001,766 | A | * | 3/1991 | Baird ........................... | 382/290 |
| 5,235,651 | A | * | 8/1993 | Nafarieh ..................... | 382/290 |
| 5,311,607 | A | * | 5/1994 | Crosby ........................ | 382/290 |
| 5,381,163 | A | * | 1/1995 | Yokoyama ................... | 382/297 |
| 5,506,908 | A | * | 4/1996 | Baumhauer et al. .......... | 381/92 |
| 5,506,918 | A | * | 4/1996 | Ishitani ........................ | 382/289 |
| 5,508,810 | A | | 4/1996 | Sato ............................. | 358/296 |
| 5,513,304 | A | * | 4/1996 | Spitz et al. .................. | 382/295 |
| 5,923,790 | A | * | 7/1999 | Miwa et al. ................. | 382/289 |
| 6,064,767 | A | * | 5/2000 | Muir et al. .................. | 382/190 |
| 6,137,905 | A | * | 10/2000 | Takaoka ....................... | 382/173 |
| 6,148,119 | A | * | 11/2000 | Takaoka ....................... | 382/289 |
| 6,151,423 | A | * | 11/2000 | Melen .......................... | 382/289 |
| 6,249,604 | B1 | * | 6/2001 | Huttenlocher et al. ...... | 382/289 |
| 6,295,385 | B1 | * | 9/2001 | Takaoka et al. ............. | 382/289 |
| 6,360,028 | B1 | * | 3/2002 | Kaji et al. .................... | 382/296 |
| 6,804,414 | B1 | * | 10/2004 | Sakai et al. ................... | 382/289 |

FOREIGN PATENT DOCUMENTS

| | | |
|---|---|---|
| EP | 0 725 359 | 8/1996 |
| EP | 0 953 932 | 11/1999 |
| JP | 62-224870 | 10/1987 |
| JP | 64-32396 | 2/1989 |

(Continued)

OTHER PUBLICATIONS

Japanese Office Action dated Aug. 26, 2003.

(Continued)

*Primary Examiner*—Ishrat Sherali
(74) *Attorney, Agent, or Firm*—Staas & Halsey LLP

(57) ABSTRACT

A line orientation determining unit determining whether the line orientation of an input document image is either vertical or horizontal, a character image extracting unit extracting a character image from the input document image, a character orientation detecting unit detecting whether or not to require a rotation, a rotational angle if the rotation is required, and mirror image flipping, which are intended for correcting the extracted character image to be properly orientated, in correspondence with the result of the determination made by the line orientation determining unit, and a document image correcting unit correcting the input document image to be properly orientated based on the result of the detection made by the character orientation detecting unit are comprised. With these units, a scanned image is automatically corrected to be a properly orientated image, even if a document such as an English document image the text of which is horizontally written in normal cases is scanned in any of upward, downward, right, and left directions, is scanned, for example, with the use of a hand-held scanner.

11 Claims, 15 Drawing Sheets

FOREIGN PATENT DOCUMENTS

| | | |
|---|---|---|
| JP | A-03-004386 | 1/1991 |
| JP | A-08-324902 | 12/1993 |
| JP | 7-28945 | 1/1995 |
| JP | A-08-212298 | 8/1996 |
| JP | 9-44593 | 2/1997 |
| JP | 10-191027 | 7/1998 |
| JP | A-11-025213 | 1/1999 |
| JP | A-11-025217 | 1/1999 |

OTHER PUBLICATIONS

Japanese Office Action dated Mar. 30, 2004.
Patent Abstracts of Japan, No. 02 79184, Hitachi Ltd., vol. 14, No. 274 dated Jun. 13, 1990.
Search Report for corresponding European Appln. No. 00305796.5 dated Mar. 16, 2006.

* cited by examiner

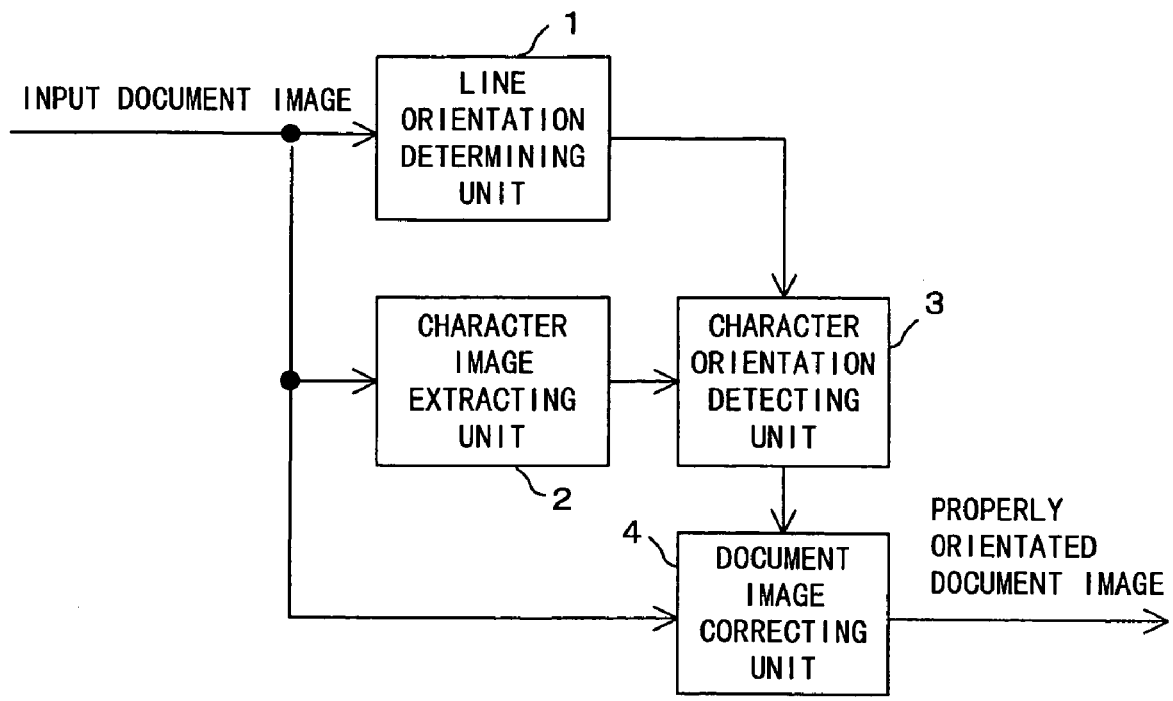
F I G. 1

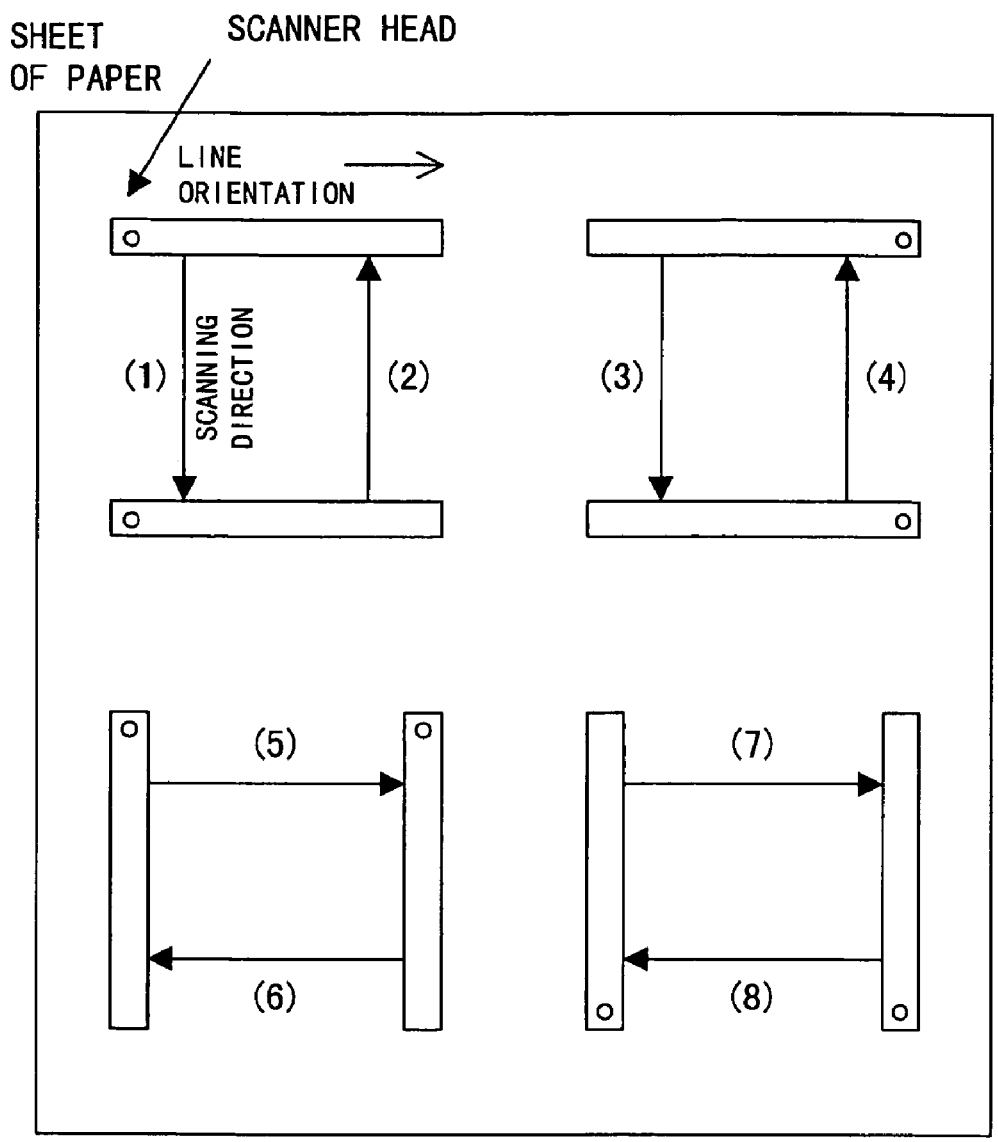
F I G. 3

|  | CHARACTER INTERVAL | CHARACTER WIDTH | BLACK PIXEL RATIO |
|---|---|---|---|
| ENGLISH DOCUMENT IMAGE | 3 PIXELS | 26 PIXELS | 48 % |
| JAPANESE DOCUMENT IMAGE | 5 PIXELS | 39 PIXELS | 36 % |
| THRESHOLD VALUE | 4 PIXELS | 33 PIXELS | 42 % |

( MEAN VALUES )

FIG. 10

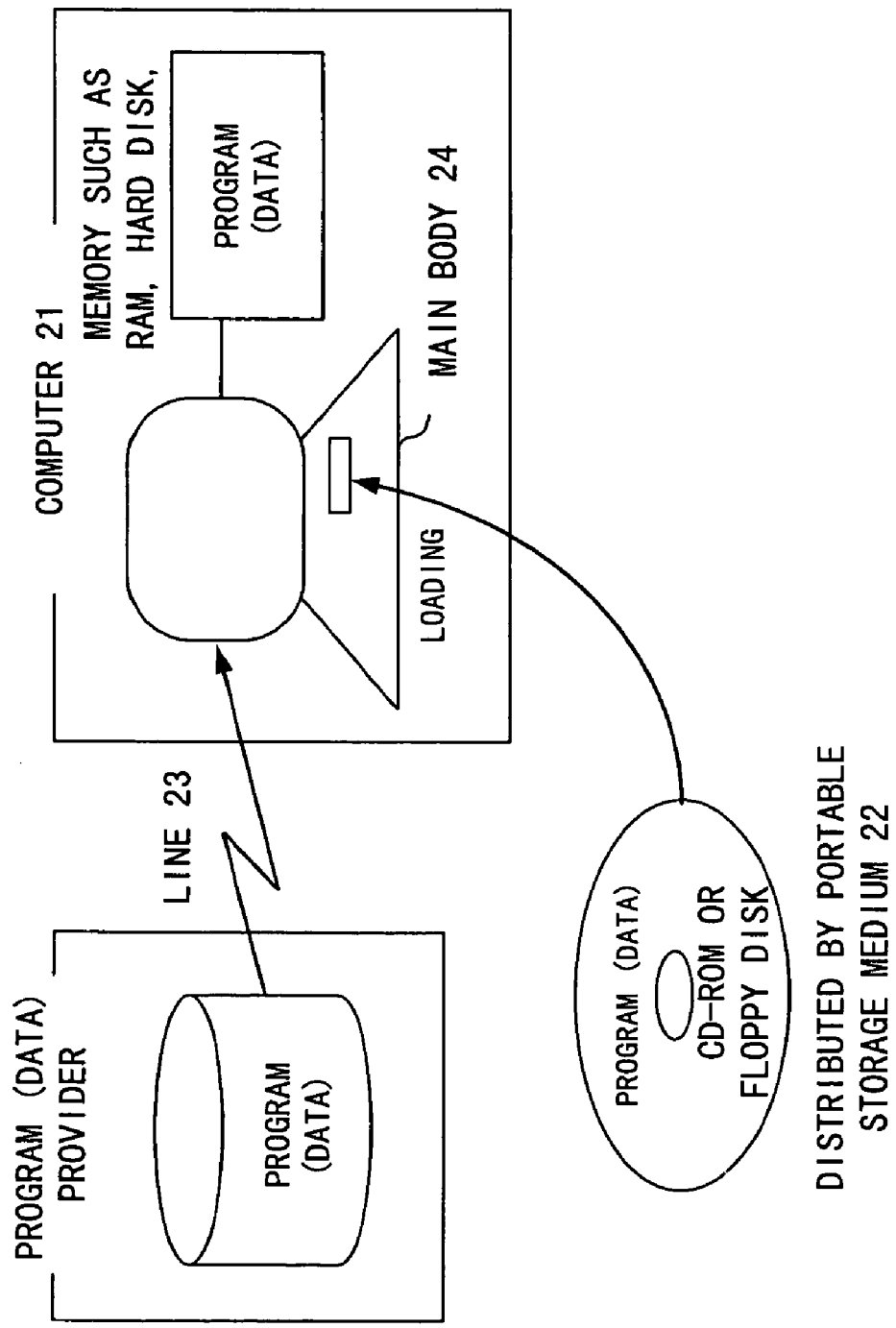
F I G. 15

DOCUMENT IMAGE CORRECTING DEVICE AND A CORRECTING METHOD

BACKGROUND OF THE INVENTION

1. Field of the Invention

The present invention relates to an image input system, etc., and more particularly, to a device which automatically correcting an English document image that is input by using an image input device such as a scanner, etc. to be a properly orientated image, and obtains a properly orientated document image, especially, by detecting as document correction methods a rotation, a rotational angle if the rotation is required, and mirror image flipping, which are intended for correcting an input document image to be properly orientated, from the input document image after the rotation or the mirror image flipping.

2. Description of the Related Art

In recent years, a manual hand-held scanner which is small-sized and easy to carry has been developed and commercialized in addition to a stationary flat-bed scanner. With the hand-held scanner, a user can perform scanning in an arbitrary direction at a high degree of discretion. However, an image may sometimes be read as a rotated image or a mirror image depending on a scanning direction. Therefore, the image must be corrected by being rotated or flipped back to the right-reading image.

With a conventional document image correcting device such as the one disclosed by Japanese Laid-open Patent Publication No. 8-212298, a character image is extracted from a scanned document image. Character recognition is performed in four directions such as in 0-, 90-, 180-, and 270-degree directions. The direction in which the degree of the likelihood (accuracy) of recognition is the highest is determined to be the orientation of the document. If the determined document orientation is not a correct orientation, the document image is corrected to be properly orientated (the orientation in which the image can be properly read as a document) by rotating the image.

Accordingly, with the conventional document image correcting device, character recognition cannot be made for a document image which is obtained by being scanned with a hand-held scanner and is flipped to a mirror image, if the character image which is extracted from the document image is rotated by any of the angles such as 0, 90, 180, and 270 degrees. As a result, its correct orientation cannot be determined, leading to a correction not being possible.

SUMMARY OF THE INVENTION

An object of the present invention is to provide a document image correcting device and a method thereof, which automatically corrects a document image (including a mirror image) to be a properly orientated image, and can reduce a processing load such as that on the rotation of a character image, etc., when a document is fundamentally limited to horizontal writing, for example, as in an English document image represented by alphabets.

In the preferred embodiment according to the present invention, a document image correcting device comprises a line orientation determining unit, a character image extracting unit, a character orientation detecting unit, and a document image correcting unit.

The line orientation determining unit determines whether the line orientation of an input document image is either vertical or horizontal. The character image extracting unit extracts character images from the input document image, for example, in units of characters. The character orientation detecting unit detects whether or not to require a rotation, a rotational angle if the rotation is required, and mirror image flipping, which are intended for correcting the character image extracted by the character image extracting unit to be properly orientated, in correspondence with the determination of the line orientation determining unit. The document image correcting unit corrects the input document image to be a properly orientated image based on the result of the detection made by the character orientation detecting unit.

In the preferred embodiment according to the present invention, the character orientation detecting unit may further comprise an image converting unit and a character recognizing unit. The image converting unit converts the character image extracted by the character image extracting unit to images which are rotated and/or flipped to a mirror image. The character recognizing unit performs character recognition for the converted character images, and outputs their character codes and the degrees of likelihood of the recognition. The character orientation detecting unit detects whether or not to require the rotation, the rotational angle if the rotation is required, and the mirror image flipping, which are intended for correcting a character image to be properly orientated, based on the result of the recognition made by the character recognizing unit.

Also in the preferred embodiment according to the present invention, the document image correcting device may further comprise a language identifying unit identifying the language of an input document image. With this unit, the document image correcting device can correct an input document image to be a properly orientated image in correspondence with the result of the determination made by the language identifying unit.

In the preferred embodiment of the present invention, the character orientation detecting unit excludes some of, for example, one half of 8 patterns including a plurality of patterns obtained by rotating a character image within a input document image and/or flipping the image to a mirror image, and an image which is unchanged from the character image, and uses the remaining patterns in correspondence with the result of the determination made by the line orientation determining unit, so that the unit can detect whether or not to require the rotation, the rotational angle if the rotation is required, and the mirror image flipping, which are intended for correcting the character image extracted by the character image extracting unit, to be properly orientated.

According to another preferred embodiment of the present invention, the document image correcting device may also comprise a line orientation determining unit, a line image extracting unit, a character orientation detecting unit, and an image correcting unit. The operations of the line orientation determining unit and the document image correcting unit are fundamentally the same as those described above.

The line image extracting unit extracts the whole or part of one line from an input document image as a line image. The character orientation detecting unit detects whether or not to require the rotation, the rotational angle if the rotation is required, and the mirror image flipping, which are intended for correcting the character image within the extracted line image to be properly orientated, in correspondence with the result of the determination made by the line orientation determining unit.

Also in this preferred embodiment, the character orientation detecting unit may further comprise an image converting unit and a character recognizing unit. The image converting unit rotates the character image within the extracted line image and/or flips the character image to a mirror image in correspondence with the result of the determination made by the line orientation determining unit. The character recognizing unit performs character recognition for the converted character images, and outputs the character codes corresponding to the respective character images within the line image and the degrees of likelihood of the recognition. The character orientation detecting unit detects whether or not to require the rotation, the rotational angle if the rotation is required, and the mirror image flipping, which are intended for correcting the character image within the extracted line image to be properly orientated, based on the result of the recognition made by the character recognizing unit.

In this preferred embodiment according to the present invention, the character orientation detecting unit can also detect a character image type as a properly orientated character image, if the character image type has a highest mean degree of likelihood of recognition performed by the character recognizing unit for the character images within each line image among character images types within the line image, to which the image converting unit converts the characters within the line image with different conversion methods, and if a preset number or more of predetermined character codes are included among the character codes corresponding to the character images within the line image.

Additionally, with a document image correcting method according to a preferred embodiment of the present invention, whether the line orientation of an input document image is either vertical or horizontal is determined, whether or not to require the rotation, the rotational angle if the rotation is required, and the mirror image flipping, which are intended for correcting the character image extracted from the input document image to be properly orientated, is detected in correspondence with the result of the determination, and the input document image can be corrected to be a properly orientated image based on the result of the detection.

Furthermore, a storage medium according to a preferred embodiment of the present invention, which is used in a document image correcting device and stores a program for causing a computer to perform a process, said process comprising the steps of: determining whether the orientation of an input document image is either vertical or horizontal; detecting whether or not to require the rotation, the rotational angle if the rotation is required, and the mirror image flipping, which are intended for correcting a character image extracted from the input document image to be properly orientated, in correspondence with the result of the determination; and correcting the input document image to be a properly orientated image based on the result of the detection.

According to the present invention, as described above, after whether the line orientation of an input document image is either vertical or horizontal is first determined, the correction process for an input document image is performed. The present invention targets a document image the text of which is not vertically written in normal cases, for example, an English document image. When the line orientation of an input document image is determined to be vertical, the document image is corrected to be a properly orientated image after the characters within the document image are rotated by 90 degrees and the document image is changed to an image the line orientation of which is horizontal.

Normally, when a document image is scanned in an arbitrary direction such as upward, downward, right or left, for example, with a hand-held scanner, 8 pattern images which are rotated and/or flipped to a mirror image are obtained depending on the orientation of the scanner head. For example, if there is a vertically written document such as a Japanese document that is represented by Chinese characters and kana being the Japanese syllabic script, the process for correcting a document image to be a properly orientated image must be performed for the 8 pattern images. However, for an English document, its patterns to be processed can be reduced to 4 by performing the process for correcting a document to be a properly orientated image after rotating the input character images by 90 degrees, when the line orientation of the document is determined to be vertical. As a result, the processing time can be reduced.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 is a block diagram showing the principle of the configuration according to the present invention;

FIG. 3 explains the directions in which a document image is scanned with a hand-held scanner;

FIG. 10 shows the mean values of the intervals between characters, the character widths, and the black pixel ratios in English and Japanese document images;

FIG. 15 explains the loading of a program for implementing the document image correcting device according to the present invention as a computer system into a computer.

DESCRIPTION OF THE PREFERRED EMBODIMENTS

Figure 2:
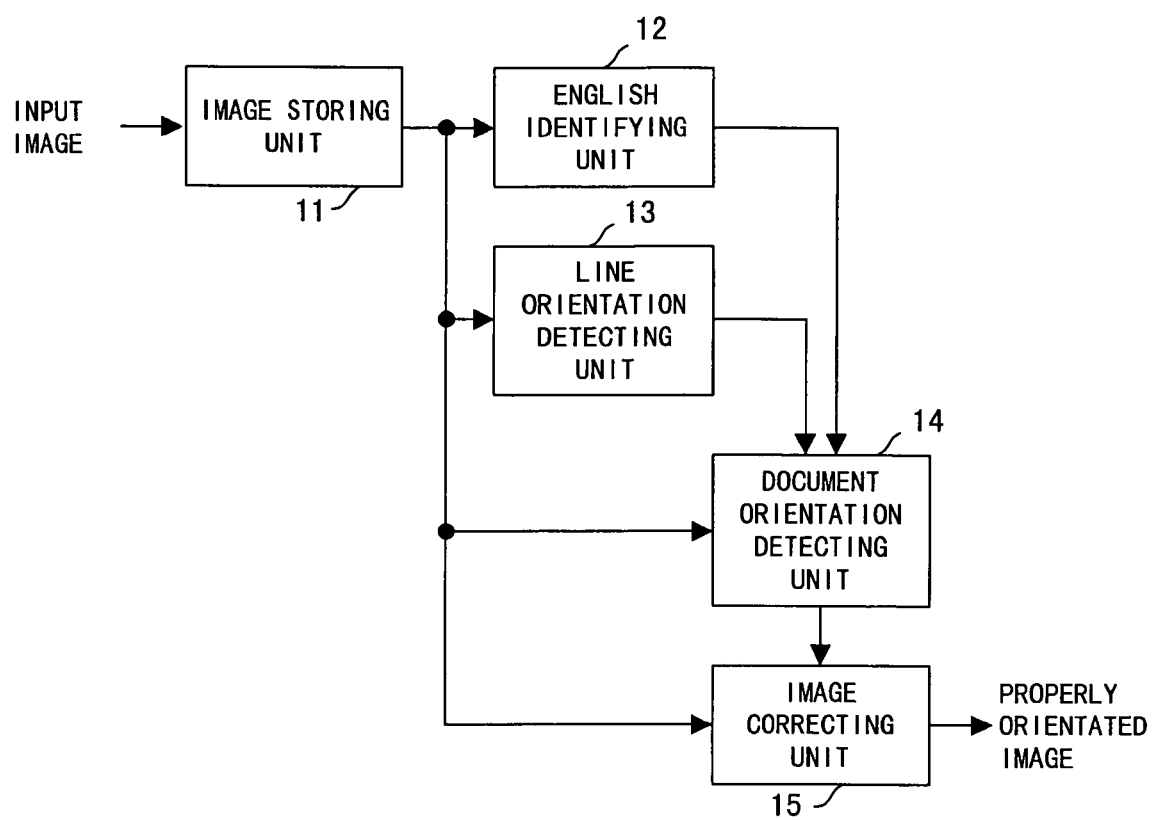
FIG. 2 is a block diagram showing the entire configuration of a document image correcting device according to the present invention.

A preferred embodiment according to the present invention is explained by mainly referring to the process for correcting a document image in a language which is normally written horizontally and is seldom written vertically, such as English, German, Russian, and the like, which are represented by alphabets. For a document image in a language which is seldom written vertically, the correlationship between the line and character orientations of an input image becomes closer.

In this preferred embodiment, if a document image is, for example, an English document image, limitations are imposed on a character rotation direction when a character orientation is determined, and the like by using this nature. Namely, if the line orientation of an input image is vertical, the number of patterns for which character recognition is to be performed can be reduced by determining the character orientation after rotating the input image by 90 degrees beforehand. This is the premise of the present invention.

FIG. 1 is a block diagram showing the principle of the configuration according to the present invention. This figure shows the principle of the configuration of the document image correcting device which corrects to be a properly orientated image a document image which is input by being rotated and/or flipped to a mirror image, for example, with the use of a hand-held scanner.

In FIG. 1, a line orientation determining unit 1 determines whether the line orientation of an input document image is either vertical or horizontal. A character image extracting unit 2 extracts character images from an input document image, for example, in units of characters.

A character orientation detecting unit 3 detects whether or not to require the rotation, the rotational angle if the rotation is required, and the mirror image flipping, which are intended for correcting a character image to be properly orientated, in correspondence with the result of the determination made by the line orientation determining unit 1, for example, as it is if the line orientation is horizontal, or after rotating the character image extracted by the character image extracting unit 2 if the line orientation is vertical. A document image correcting unit 4 corrects the input document image to be a properly orientated image based on the result of the detection made by the character orientation detecting unit 3.

According to the present invention, as described above, the process for correcting an input document image is performed after determining whether the line orientation of the input document image is either vertical or horizontal. The present invention targets a document image the text of which is not written vertically in normal cases, such as an English document image. If the line orientation of an input document image is determined to be vertical, the process for correcting a document image to be a properly orientated image is performed after the document image is converted to an image the line orientation of which is horizontal by rotating the characters within the input document image by 90 degrees.

Normally, when a document image is scanned in an arbitrary direction such as upward, downward, right, or left, for example, with a hand-held scanner, 8 pattern images, which are rotated and/or flipped to a mirror image depending on the orientation of the head, are obtained. Assuming that a vertically written document such as a Japanese document represented by Chinese characters and kana exists, the process for correcting a document image to be a properly orientated image must be performed for the 8 pattern images. However, for an English document, the patterns to be processed can be reduced to 4 by performing the process for correcting an input document image to be a properly orientated image after rotating input character images by 90 degrees, when the line orientation is determined to be vertical. Consequently, the processing time can be reduced.

FIG. 2 is a block diagram showing the entire configuration of the document image correcting device according to the preferred embodiment of the present invention. In the preferred embodiment according to the present invention, as described above, a document image in a language which is normally written horizontally and is seldom written vertically, such as an English document image, is targeted, its line orientation is detected, the orientation of the character images is detected according to the result of the detection, and the document image is corrected in correspondence with the orientation of the character images. Note that a character image indicates an image obtained by extracting a rectangular area which circumscribes a character.

In FIG. 2, an image storing unit 11 is intended to store a document image input by a scanner. An English identifying unit 12 is intended to identify whether or not the language of the document image is English. A line orientation detecting unit 13 is intended to detect whether the line orientation of the input image is either vertical or horizontal.

A document orientation detecting unit 14 detects the orientation of characters, namely, whether or not to require the rotation, the rotational angle if the rotation is required, and the mirror image flipping, which are intended for correcting the characters within the input image to be properly orientated, in correspondence with the result of the detection made by the line orientation detecting unit 13, if the language of the input document image is determined to be English by the English identifying unit 12. Assuming that the line orientation detected by the line orientation detecting unit 13 is vertical, the document orientation detecting unit 14 detects the orientation of the characters after rotating the input image by 90 degrees. An image correcting unit 15 corrects the image stored in the image storing unit 11 in correspondence with the result of the detection made by the document orientation detecting unit 14, namely, the rotational angle for correcting the characters within the input image and the result of the detection of whether or not to require the mirror image flipping, and outputs the corrected image as a properly orientated image.

Figure 4:
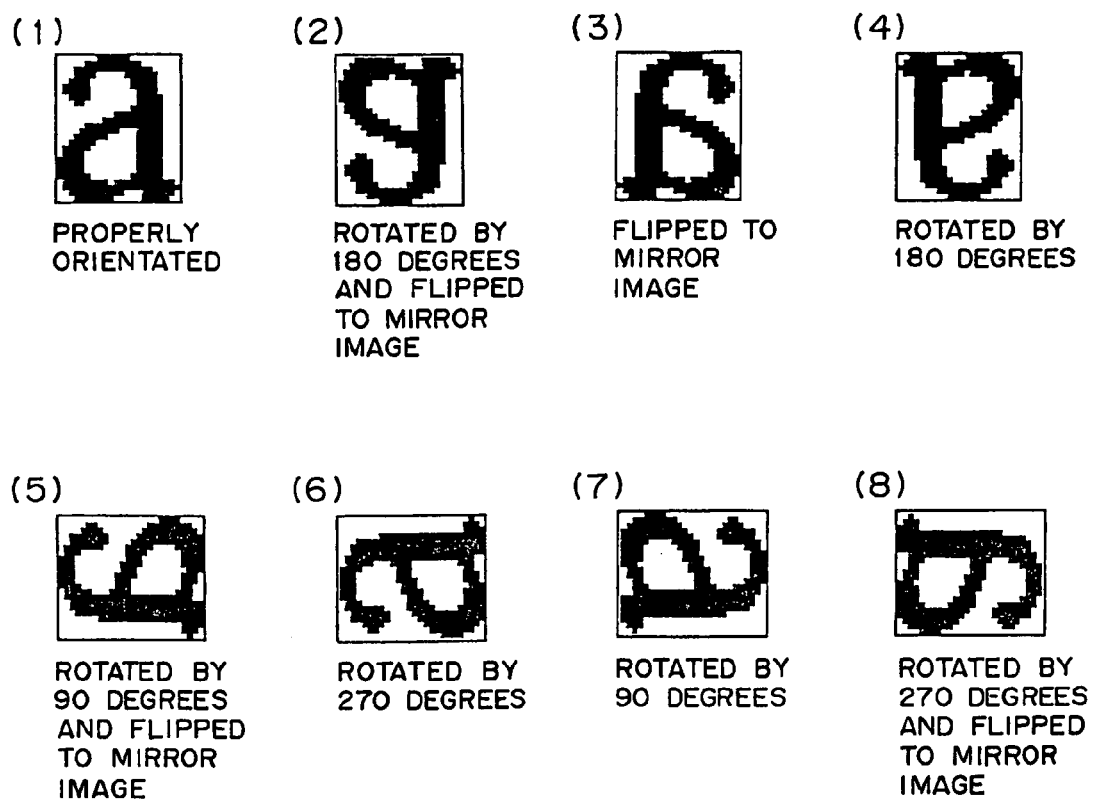
FIG. 4 exemplifies the images captured in correspondence with the scanning directions shown in FIG. 3.

Here, the scanning directions of a hand-held scanner and the images input by the scanner are explained by referring to FIGS. 3 and 4. As shown in (1) through (8) of FIG. 3, a document image can be scanned in any direction such as upward, downward, right, or left with a hand-held scanner. Accordingly, if scanning is performed in the directions other than the direction shown in (1) of FIG. 3, a character image may be read as a rotated image and/or a mirror image depending on a scanning direction.

For example, if a properly orientated character "a" exists in the document, and if this character is scanned in the directions shown in (1) through (8) of FIG. 3, images to be captured are like those shown in (1) through (8) of FIG. 4. Assuming that the scanning is performed as shown in (3) of FIG. 3, the upper portion of the character image is captured unchanged as that of the input image. However, since the scanner head exists on the right side, the right portion of the document image is captured first. As a result, the right portion of the document image becomes the left portion of the input image. Therefore, the mirror image in which the right and left portions of the document image are flipped is captured as the input image.

Among the total of 8 image patterns including the character image extracted unchanged from the image input by the scanner, and the images obtained by rotating the extracted character image by 90, 180, and 270 degrees, and/or by flipping to a mirror image, there is a strong possibility that a properly orientated image is included. This depends on the operational direction of the scanner, though.

Speaking of the image itself input by the scanner, the 8 patterns shown in (1) through (8) of FIG. 4 exist as the states of that character image, even if the document image is an English document. However, a normal English text is not vertically written. As indicated by an arrow in the upper portion of FIG. 3, the line orientation is horizontal. Originally, there is a very slight possibility that the images shown in (5) through (8) of FIG. 4 exist in an English document. If the line orientation of the input image is vertical, the characters within the input image will be like any of the images (5) through (8). However, a document the line orientation of which is vertical does not exist in normal English writing. Accordingly, when the line orientation of an input document image which is not written vertically as in an English document is determined to be vertical, the input image is corrected after being rotated by 90 degrees when the line orientation of the image is determined to be vertical. For the same reason, the input image is not rotated by 90 degrees if the line orientation of the input image is horizontal. The resultant character images become only the 4 states shown in (1) through (4) of FIG. 4. Therefore, also the character orientation may be detected only for these 4 patterns.

In the preferred embodiment according to the present invention, the line orientation is detected prior to the correction of, for example, an English document image as explained by referring to FIG. 2. If the detected line orientation is vertical, an input image is corrected after being rotated by 90 degrees beforehand for the sake of convenience of character recognition processing. In this way, the 8 patterns shown in FIG. 4 can be reduced to 4, whereby also the processing time taken to make a correction can be halved in comparison with, for example, the time taken to correct a Japanese document image represented by Chinese characters and kana.

The line orientation of an image input by a scanner becomes vertical when scanning is performed in the direction parallel to the lines. That is, this is the case where a scanner is moved from the right to the left or vice versa as shown in (5) through (8) of FIG. 3, assuming that an operator is facing an English document to be scanned. At this time, the states of the input image will be the 4 patterns shown in (5) through (8) depending on whether the scanner head is oriented either upward or downward.

In the meantime, the line orientation of the image input by the scanner becomes horizontal when scanning is performed by moving the scanner from upward to downward or vice versa as shown in (1) through (4) of FIG. 3, assuming that the operator is present at the same position. The image patterns the line orientation of which becomes horizontal are the 4 patterns shown in (1) through (4) depending on whether the scanner head is oriented either the left or the right.

As described above, according to the preferred embodiment of the present invention, whether the line orientation is either vertical or horizontal is first determined for an input document image. Since its method is known, its explanation is omitted here. There is no need to use a specific method as this method. For example, with the methods disclosed by Japanese Patent Publication Nos. 11-25213 and 11-25217, 3-4386, etc, the line orientation can be detected.

Figure 5:
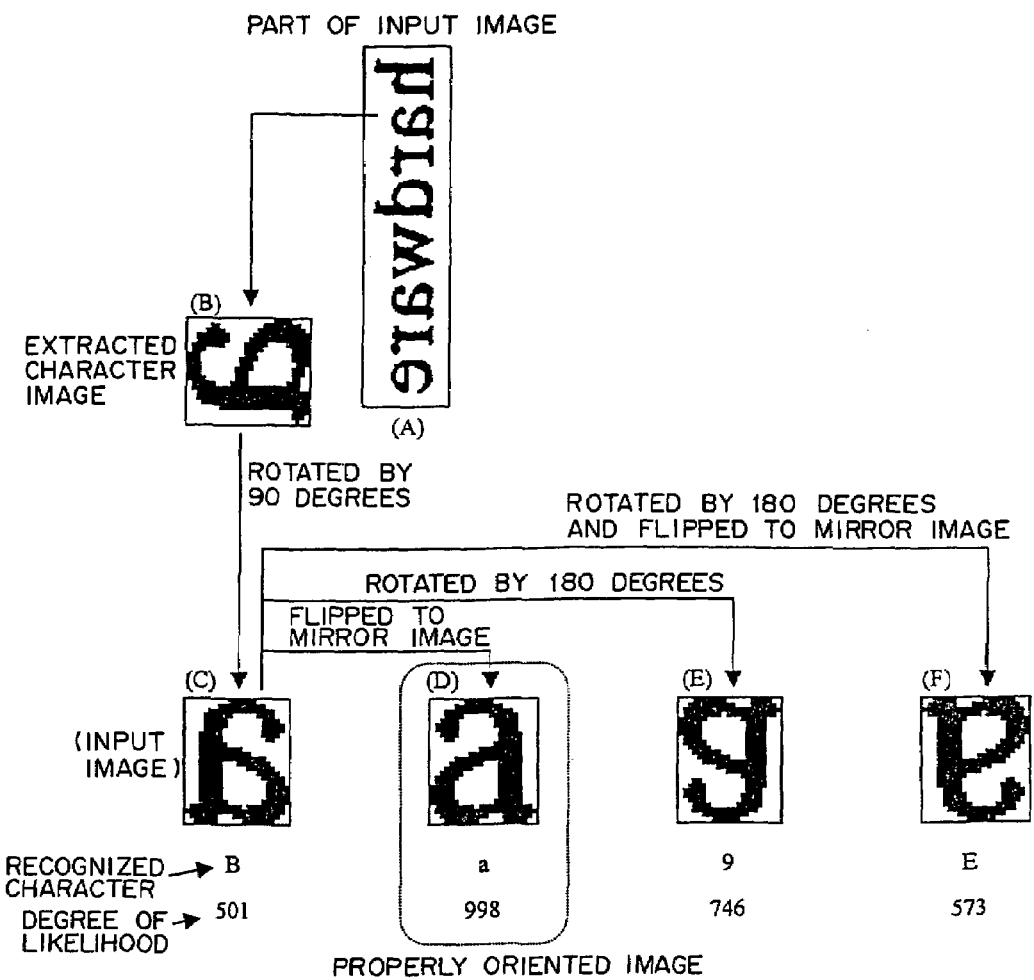
FIG. 5 explains the detection of the orientation of a character image if the line orientation of an input document image is vertical.
Figure 6:
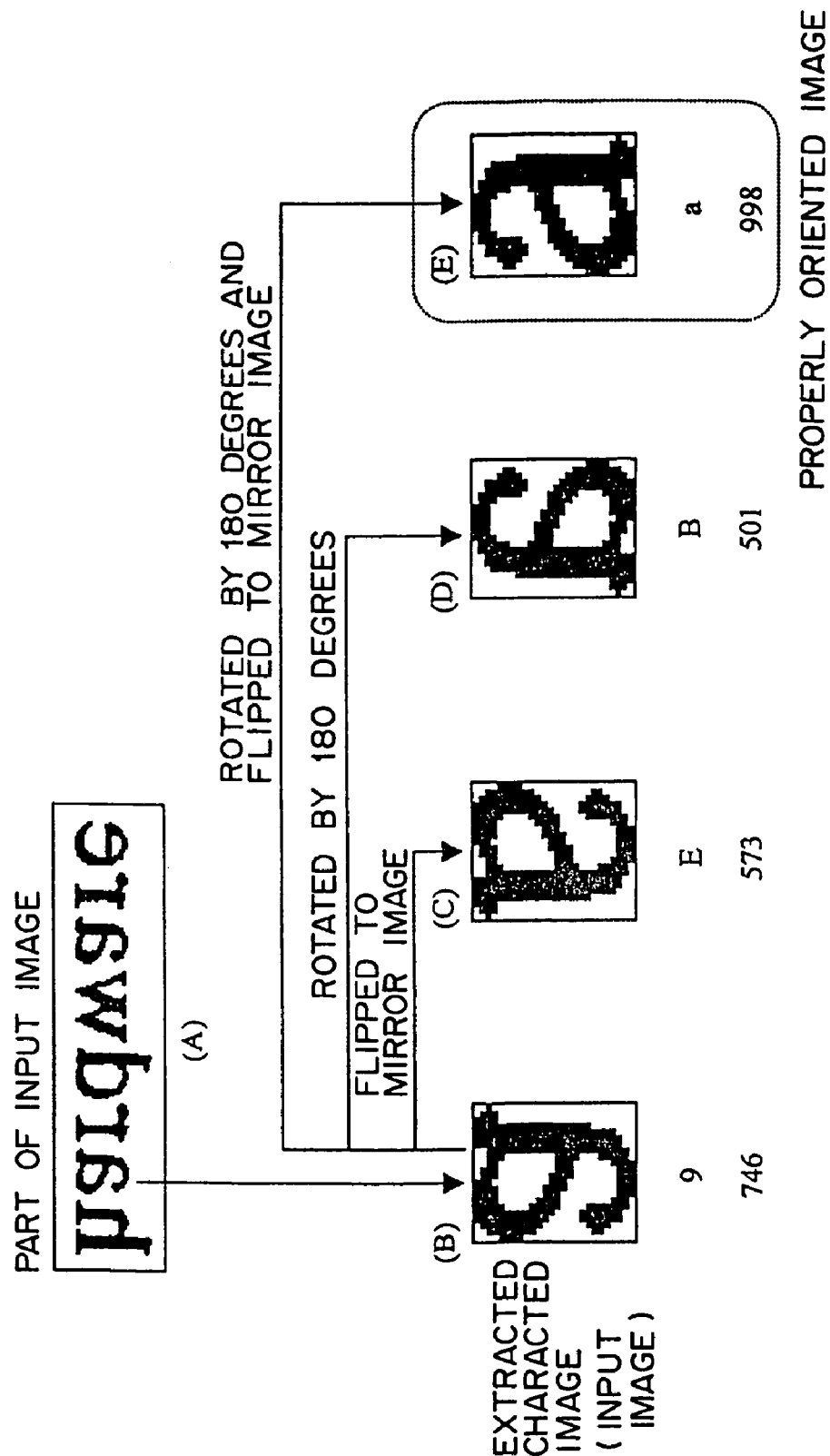
FIG. 6 explains the detection of the orientation of a character image if the line orientation of an input document image is horizontal.

The orientation detection of a character image, which is performed when the line orientation of an input image is both vertical and horizontal, is explained by referring to FIGS. 5 and 6. FIG. 5 explains the orientation detection of a character image when the line orientation is vertical. An image (A) of FIG. 5 is part of an image input by a scanner, and the line orientation of the input image is vertical. In this case, a character image (B) extracted from the input image is first rotated by 90 degrees, and an image (C) is obtained. Then, an image (D) obtained by flipping the character image (C) to a mirror image where the right and left portions are reversed, an image (E) obtained by rotating the character image (C) by 180 degrees, and an image (F) obtained by rotating the character image (C) by 180 degrees and flipping the rotated image are obtained on the basis of the character image (C), so that the 4 images can be obtained as character recognition targets.

There is a strong possibility that a properly orientated image is included among these 4 images (C) through (F), although this depends on the operational direction of the scanner. In the case shown in FIG. 5, (D) is a properly orientated image. Character recognition is made for these 4 images, and the characters resultant from the recognition and the degrees of likelihood of the recognition are obtained. The maximum value of the degree of likelihood is defined to be 999 in this preferred embodiment according to the present invention. As a result of the recognition, the character image (D) is recognized to be a character "a", and its degree of likelihood is obtained to be 998.

FIG. 6 explains the detection of the orientation of the character image if the line orientation of the input image is horizontal. If the line orientation is horizontal, the extracted character image is recognized to be a character image (B) unchanged as a basis, unlike in FIG. 5. Namely, a mirror image (C) obtained by flipping the right and the left portions of the character image (B), an image (D) obtained by rotating the character image (B) by 180 degrees, and an image (E) obtained by rotating the character image (B) by 180 degrees and flipping the rotated image are obtained. Character recognition is then performed for these 4 character images. Here, the image (E) is obtained as a properly orientated image.

As described above, In this preferred embodiment, orientation detection is made after an input image is rotated by 90 degrees if the line orientation of the input image is vertical, based on the premise that an English document is not vertically written.

Figure 7:
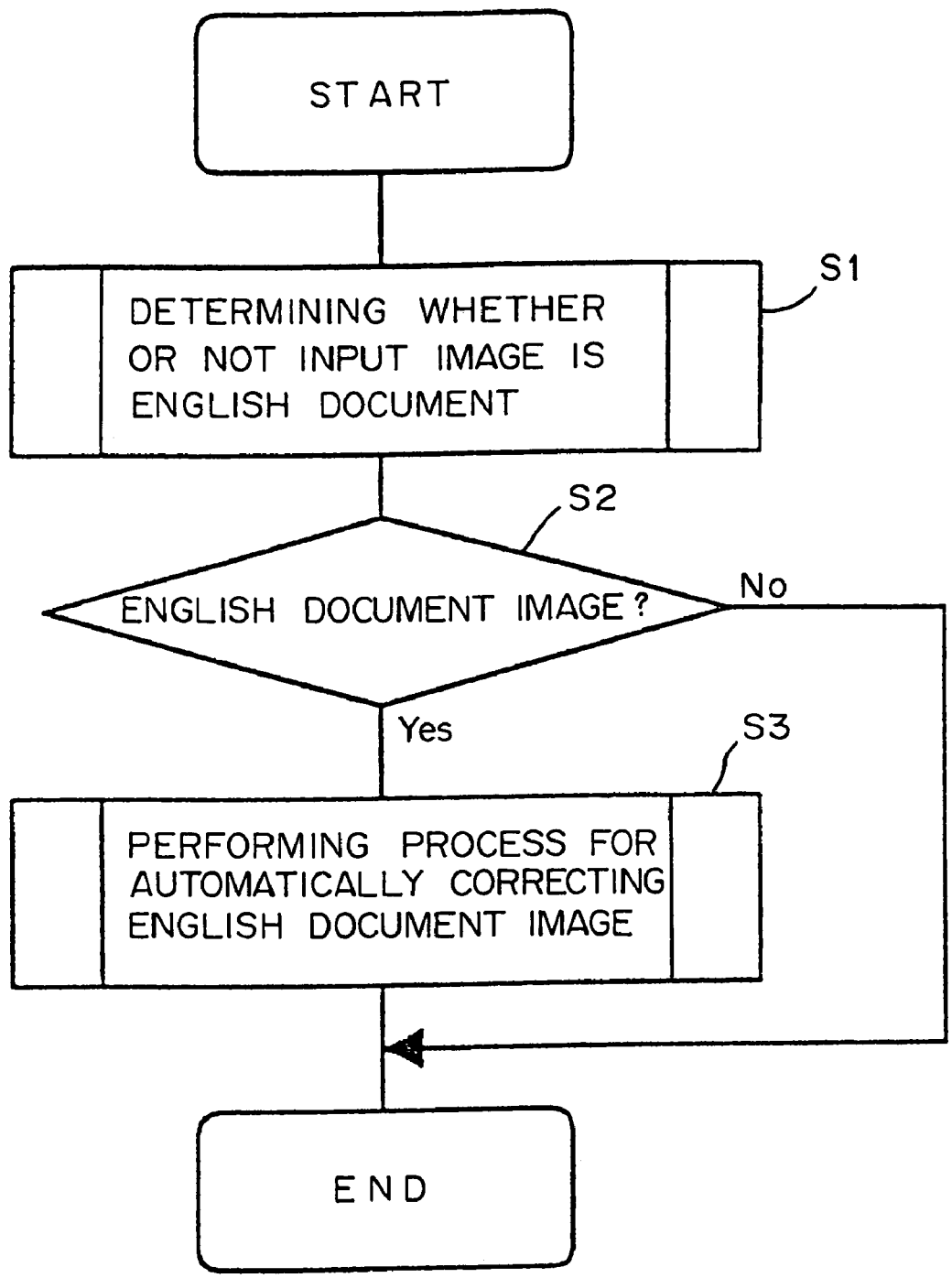
FIG. 7 is a flowchart showing the entire process for automatically correcting an English document image.

Next, the process for correcting a document image in the preferred embodiment of the present invention will be further described in detail. FIG. 7 is a flowchart showing the entire process for automatically correcting an English document image. In this figure, in step S1, whether or not an input image is an English document is first determined. In step S2, the process is terminated if the input image is not an English document as a result of the above described determination. However, a different correction process may be performed at this time. If the input image is an English document image, the process for automatically correcting the orientation of an English document image is performed in step S3 after the determination process in step S2. The process is then terminated.

Figure 8:
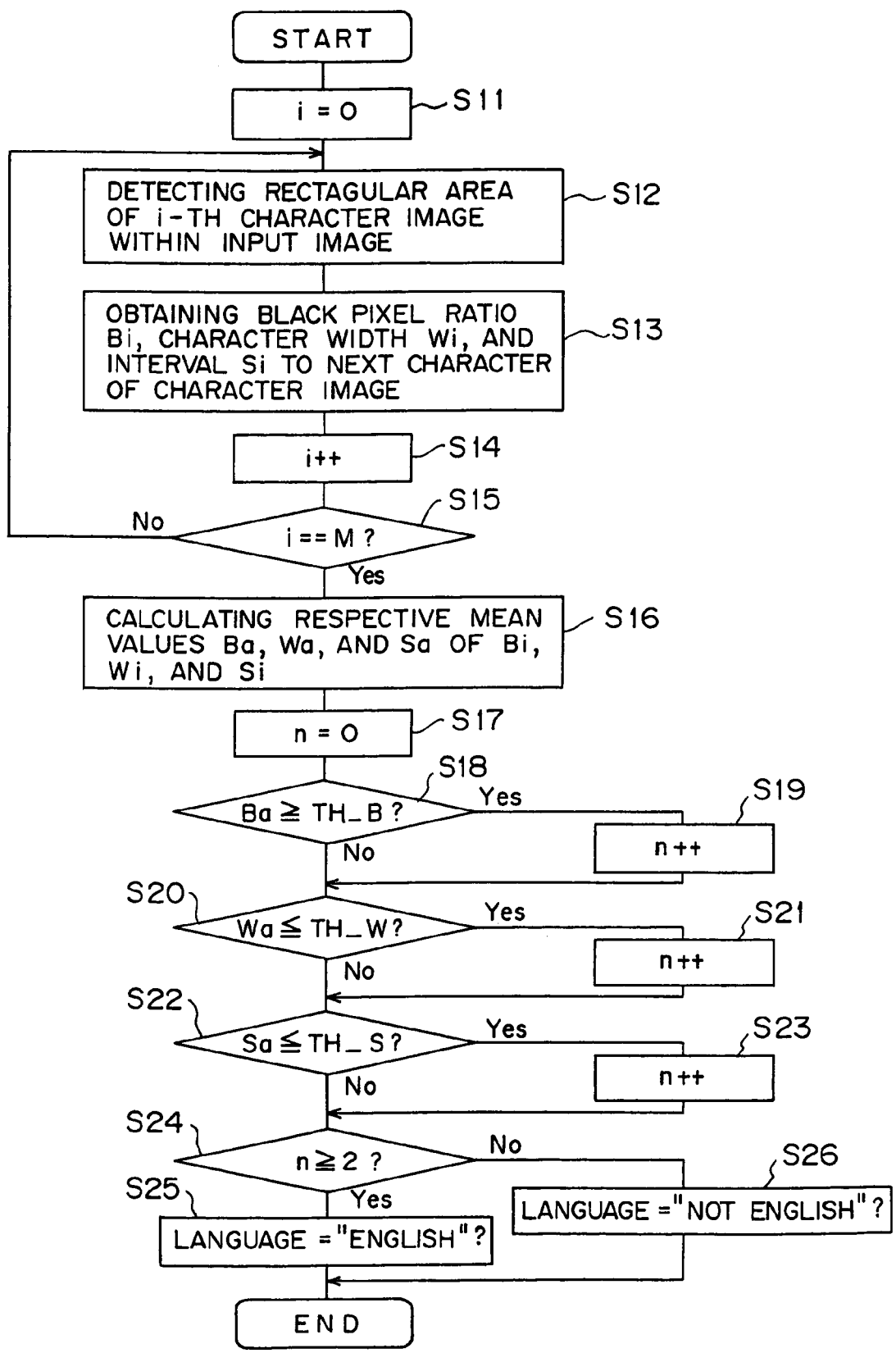
FIG. 8 is a flowchart showing the details of the process for identifying English.

FIG. 8 is a flowchart showing the English identification process performed by the English identifying unit 12. Once the process is started in this figure, the value of "i" indicating the number of characters extracted from an input image is initialized to "0" in step S11. Then, in step S12, the rectangular area of an i-th character image within the input image is detected. In step S13, a black pixel ratio Bi and a character width Wi of the character image within the rectangular area, and an interval Si between this character image and the next character image are obtained. The value of "i" is incremented in step S14, and whether or not this value reaches "M" is determined in step S15. Here, "M" is the number of character images used to identify whether or not a document image is English. If the value of "i" does not reach "M", the operations in and after step S12 are repeated.

Figure 9:
FIG. 9 explains an interval between English character images and a character width of an English character image.

In this preferred embodiment, the black pixel ratio and the character width of a character image, and the character interval between the character image and the next character image, which are obtained in step S13, are used to identify whether or not the language of an input document image is English. FIG. 9 exemplifies the character interval and width.

FIG. 10 shows the mean values of character intervals, character widths, and black pixel ratios of English and Japanese document images, when the documents are input by a scanner at 400-dpi (dots per inch) resolution. The black pixel ratio is a ratio of pixels structuring a character to the total number of pixels within the character image. If the mean values of the character intervals, the character widths, and the black pixel ratios of the Japanese and English documents are taken as the threshold values for identifying the difference between English and Japanese, the values in the bottom line in FIG. 10 can be used as the threshold values. By comparing with the threshold values, whether the language of an input document image is either English or Japanese can be identified.

Turning back to FIG. 8. If the value of "i" being the number of characters extracted from the input image is determined to become equal to "M" being the number of characters used to identify English in step S15, the respective mean values Ba, Wa, and Sa of the black pixel ratio Bi, the character width Wi, and the character interval Si are calculated for the "M" character images in step S16. In step S17, the value of "n" indicating the number of conditions under which the document is determined to be English among the 3 identification conditions, which respectively correspond to the black pixel ratio, the character width, and the character interval, is initialized to "0".

Then, in step S18, whether or not the mean value Ba of the black pixel ratio is equal to or larger than a threshold value TH_B is determined. If the mean value Ba is equal to or larger than the threshold value TH_B, the value of "n" is incremented in step S19. If the mean value Ba is smaller than the threshold value TH_B, the process immediately goes to step S20.

In step S20, whether or not the mean value Wa of the character width is equal to or smaller than a threshold value TH_W is determined. If the mean value Wa is equal to or smaller than the threshold value TH_W, the value of "n" is incremented in step S21. If the mean value Wa is larger than the threshold value TH_W, the process immediately goes to step S22. In step S22, whether or not the mean value Sa of the character interval is equal to or smaller than a threshold value TH_S is determined. If the mean value Sa is equal to or smaller than the threshold value TH_S, the process goes to step S24 after the value of "n" is incremented in step S23. If the mean value Sa is larger than the threshold value TH_S, the process immediately goes to step S24.

Then, in step S24, whether or not the number "n" of the conditions under which the document is determined to be English is 2 or more among the three identification conditions is determined. If the value of "n" is equal to or larger than 2, the language of the document is determined to be English in step S25. If the value of "n" is not equal to or larger than 2, the language is determined not to be English in step S26. The process is then terminated. Note that in the example of FIG. 10, the threshold values of the black pixel ratio, the character width, and the character interval are respectively 42 percent, 33 pixels, and 4 pixels.

Here, a comparison is made between character spacing in English and Japanese documents. Characters are spaced in a row at nearly identical intervals in the Japanese document, whereas characters are spaced at different intervals between words and between characters within a word in the English document. This is because the English document is structured by words, each of which is composed of a plurality of characters. For a Japanese document image, character intervals of 3 to 15 pixels or so are consecutively detected if character intervals are viewed from the first character. In the meantime, in an English document, narrow character intervals of 1 to 5 pixels or so are consecutively detected from characters within a word, and a wide character interval of 11 pixels or so, which indicates the interval between the last character of the word and the first character of the next word, then appears. Note that the above described numbers of pixels in the character intervals are one example when the documents are read by a scanner at 400-dpi resolution.

Figure 11:
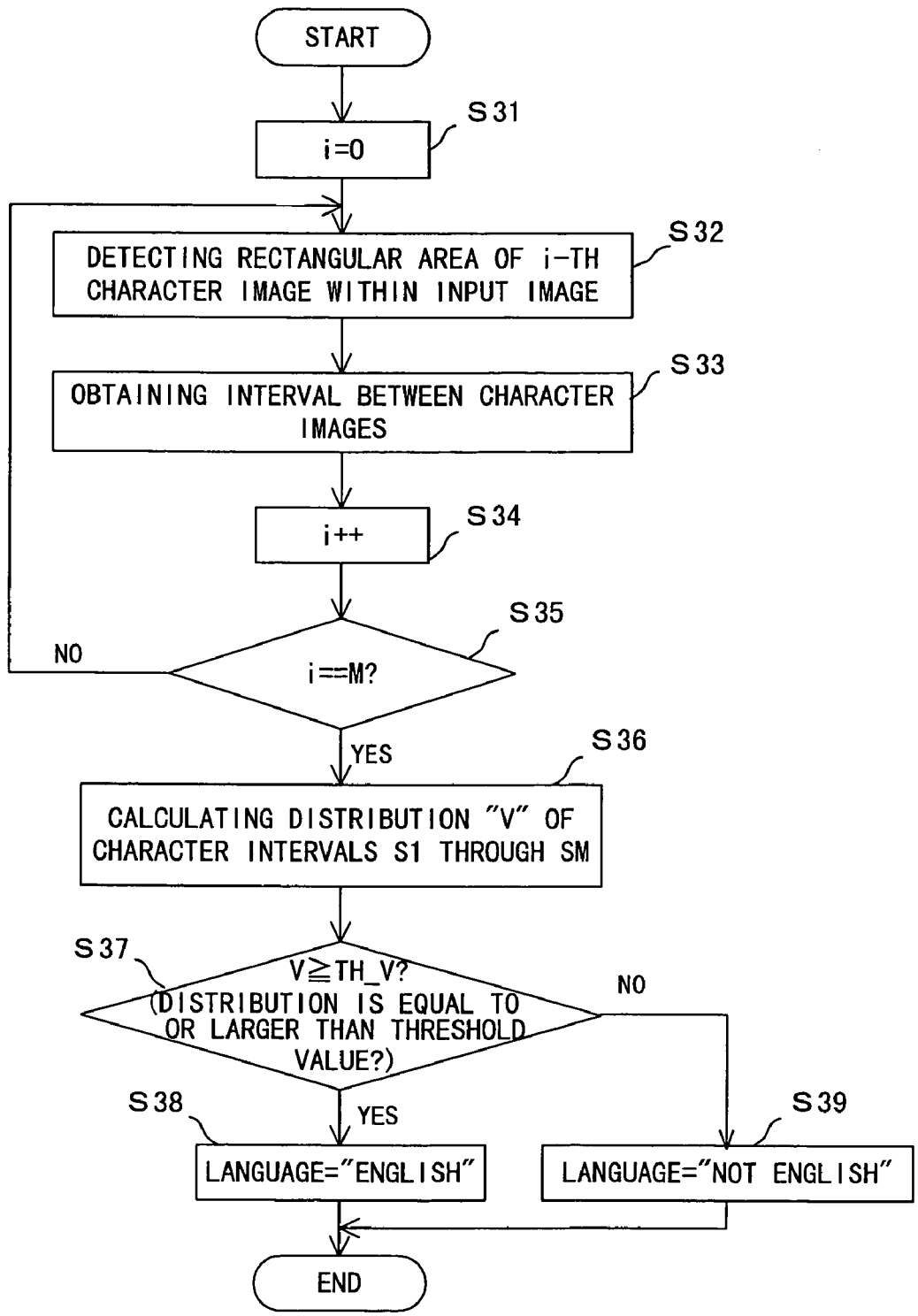
FIG. 11 is a flowchart showing the process for identifying English by using the difference between character intervals.

By using such differences between the character intervals, the English identification process can be also performed. FIG. 11 is a flowchart showing the English identification process performed in such a case. Once the process is started, the value of "i" is initialized to "0" in step S31 in a similar manner as in step S11 of FIG. 8. In step S32, the rectangular area of an i-th character image is detected in a similar manner as in step S12. In step S33, the character interval Si to the next character image is obtained. The value of "i" is incremented in step S34, and whether or not this value reaches the above described value of "M" is determined in step S35. If the value of "n" does not reach "M", the operations in and after step S32 are repeated.

If the value of "i" is determined to reach "M" in step S35, the value of a distribution "V" of the character intervals S1 through SM is calculated in step S36. In step S37, whether or not the value of the distribution "V" is equal to or larger than a threshold value TH_V is determined. If this value is equal to or larger than the threshold value TH_V, a language is determined to be English in step S38. If the value of "V" is not equal to or larger than the threshold value TH_V, the language is determined not to be English in step S39. The process is then terminated.

To identify whether or not a language is English, the value of the distribution between character intervals is used in FIG. 11. The more the original numeric values disperse, the larger the distribution value becomes. The less the numeric values disperse, the smaller the distribution value becomes. Therefore, the nature such that the distribution value becomes smaller if character intervals disperse narrowly as in a Japanese document, and that character intervals between characters within a word and between words disperse widely as in an English document is used. By comparing with a predetermined distribution threshold value, English is identified.

Figure 12:
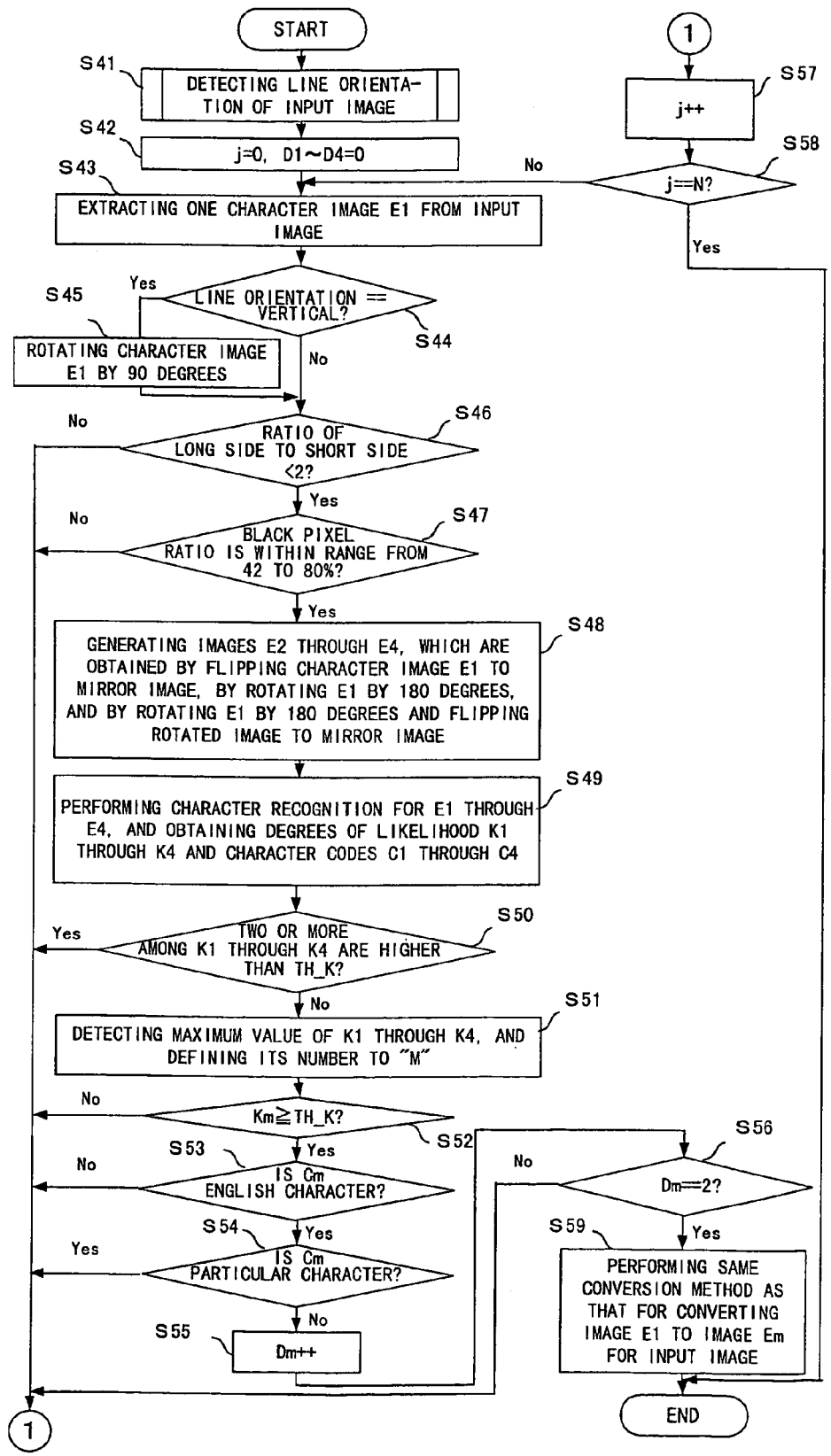
FIG. 12 is a flowchart showing the details of the process for automatically correcting a document image by extracting each character image.

FIG. 12 is a flowchart showing the process for automatically correcting a document image to be a properly orientated image by extracting character images from an English document image in units of characters, and by detecting whether or not to require the rotation, the rotational angle if the rotation is required, and the mirror image flipping, which are intended for correcting a document image to be properly orientated. This flowchart mainly corresponds to the processes performed by the document orientation detecting unit 14 and the image correcting unit 15, and the process in step S3 of FIG. 7.

Once the process is started in this figure, the line orientation of an input image is detected in step S41. In step S42, the value of "j" indicating the number of characters extracted to be used for orientation detection, and the values of D1 through D4 as variables for counting characters detected to be properly orientated images among the 4 images which are explained by referring to FIGS. 5 and 6. are initialized to "0". If E1 (the method for converting a character image to E1) is detected as a method for correcting a character image to be a properly orientated image, the value of D1 is incremented. If any of the methods for converting a character image to E2 through E4 is detected as a method for correcting a character image to be a properly orientated image, any of D1 through D4 is incremented.

In step S43, one character image E1 is extracted from the input image. The process for extracting a character image is, for example, the one performed in step S12 of FIG. 8. With the result of this process, the need for performing an actual character extraction process in step S43 is eliminated.

In step S44, whether or not the line orientation is vertical is determined in correspondence with the result of the line orientation detection made in step S41. If the line orientation is determined to be vertical, the process goes to step S46 after the character image E1 is rotated by 90 degrees in step 45. If the line orientation is determined not to be vertical, the process immediately goes to step S46.

In step S46, whether or not the ratio of the long side to the short side of the character image E1 (here, also a character image which is rotated by 90 degrees is assumed to be a symbol E1 for ease of explanation) is smaller than 2 is determined. By selecting as an orientation detection target only a character image the ratio of which is smaller than a predetermined value obtained by dividing the length of the long side by that of the short side of the character image, 2 in this case, an image where two characters are linked or part of a graphic can be prevented from being extracted incorrectly as a character image. Accordingly, if the ratio of the character image E1 is not smaller than 2 in step S46, the orientation is not detected from the character image. The value of "i" is incremented in step S57. If the value of "j" does not reach "N" which indicates the number of images to be extracted, according to which the character image correction process must be aborted in step S58, the operations in and after step S43 are repeated.

If the ratio of the long side to the short side is smaller than 2 in step S46, whether or not the black pixel ratio is within the range from 42 to 80 percent is determined in step S47. If this ratio is outside the range, the process goes to step S57. Here, 47 percent is the threshold value explained by referring to FIG. 10. Additionally, if an image which is too black, it can possibly be a blot or part of a graphic. Therefore, the orientation is not detected from the character image the black pixel ratio of which is equal to or higher than 80 percent.

If the black pixel ratio is within the range from 42 to 80 percent, an image E2 obtained by flipping the character image E1 to a mirror image, an image E3 obtained by rotating the character image E1 by 180 degrees, and an image E4 obtained by rotating the character image E1 by 180 degrees and flipping the rotated image are generated in step S48. Then, character recognition is performed for the images E1 through E4 in step S49. Character codes C1 through C4 as recognition results and the degrees of likelihood of the recognition K1 through K4 are obtained.

Figure 13:
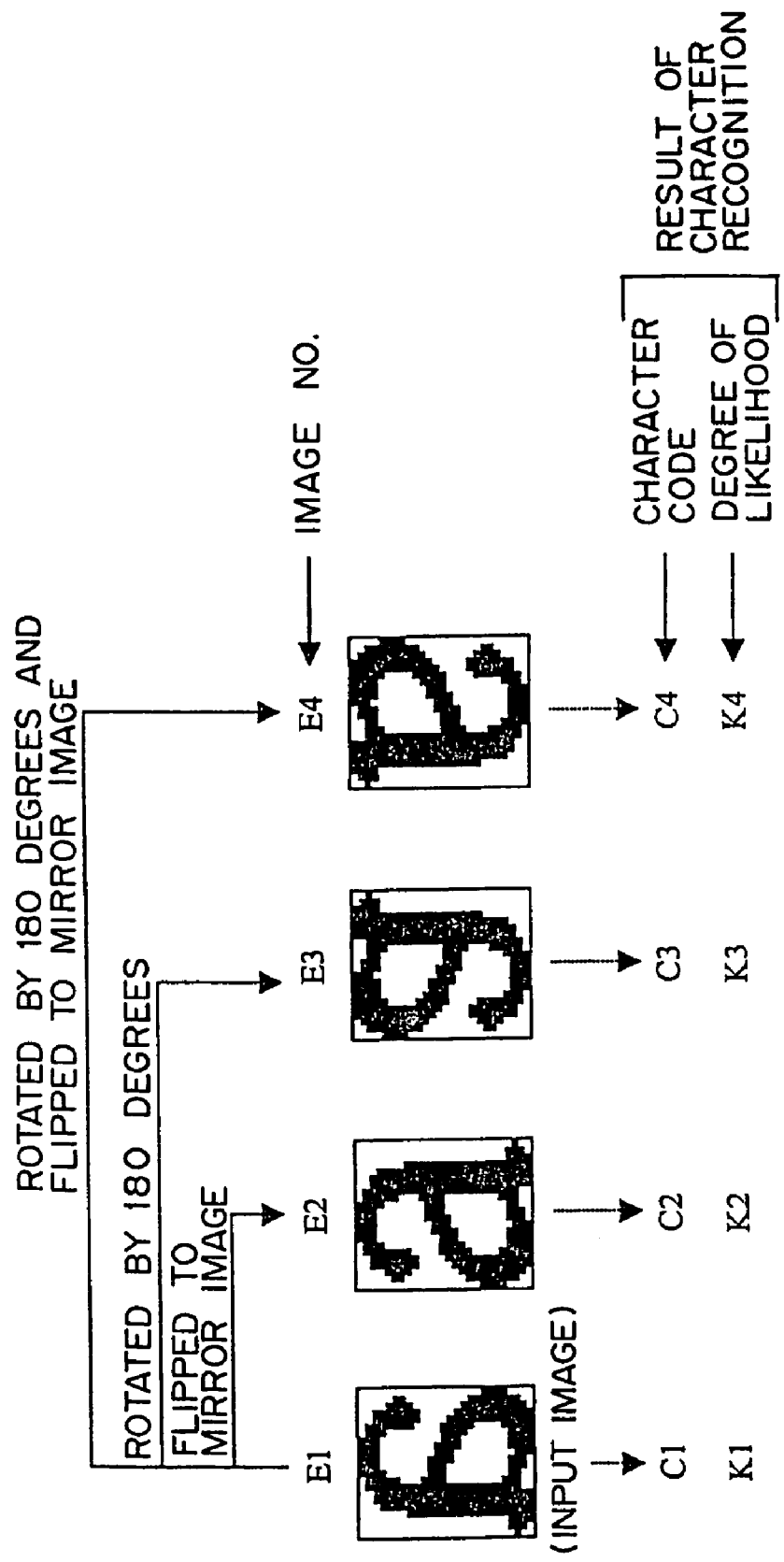
FIG. 13 explains character codes as character recognition results, and the degrees of likelihood of character recognition.

Here, the character codes as the recognition results and the degrees of likelihood are explained by referring to FIG. 13. In FIG. 13, one input character image or an image E1 obtained by rotating the character image by 90 degrees, an image E2 obtained by flipping E1 to a mirror image, an image E3 obtained by rotating E1 by 180 degrees, and an image E4 obtained by rotating E1 by 180 degrees and flipping the rotated image are obtained. Then, character codes C1 through C4 resultant from the recognition performed for these images, and their degrees of likelihood K1 through K4 are obtained.

Turning back to FIG. 12. In step S50, it is determined whether or not 2 or more of the 4 degrees of likelihood K1 through K4 are equal to or higher than a predetermined threshold value TH_K of the degree of likelihood. In this preferred embodiment, an extracted character image itself can possibly be distorted, or an extracted image is not a character but can possibly be an image for which character recognition cannot be originally performed, such as part of a graphic, etc.

Character orientation such as a rotational angle, etc. cannot be detected from such images. Therefore, if all of the 4 degrees of likelihood resultant from the character recognition performed for the 4 images that are obtained by being rotated and/or flipped are lower than the predetermined threshold value, it is determined that the character recognition cannot be performed, and the orientation is not detected from the input image. As a result, the orientation detection accuracy is improved.

Additionally, symmetrical character images such as "A" or "T" are recognized to the same characters even if they are flipped to mirror images. Therefore, the degrees of likelihood resultant from the character recognition performed for 2 of the 4 images corresponding to such images may become high to the same extent. Accordingly, if the degrees of likelihood resultant from the character recognition performed for 2 or more images are equal to or higher than a threshold value among the 4 character images which are obtained by rotating a character image extracted from an input image or by flipping the extracted character image to a mirror image, the orientation detection accuracy can be improved by eliminating the detection of the orientation from the input image.

If 2 or more of the degrees of the likelihood are higher than the threshold value in step S50, the process goes to step S57. If the number of extracted character values does not reach "N", the operations in and after step S43 are repeated.

If 2 or more of K1 through K4 are not equal to or higher than the threshold value, namely, if 0 or 1 of K1 through K4 is equal to or higher than the threshold value, the maximum value of K1 through K4 is detected and is defined to be Km ("m" is any of 1 through 4) in step S51. In step S52, whether or not the value of Km is equal to or higher than the threshold value is determined. If the value of Km is not equal to or higher than the threshold value, all of the 4 degrees of likelihood are lower than the threshold value. Therefore, control is transferred to the operations in and after step S57.

If the value of Km is equal to or higher than the threshold value in step S52, the degree of likelihood which is equal to or higher than the threshold value is only Km. Then, it is determined whether or not a character code Cm corresponding to Km is a code corresponding to an English character in step S53. If Cm is not a code corresponding to an English character, it is inadequate to detect the orientation from the character image. This is because the process for automatically correcting an English document image is intended to be performed here. The process then goes to step S57 and subsequent steps.

If the character code Cm is a code corresponding to an English character in step S53, it is determined whether or not Cm is a code corresponding to a particular character. Here, a character the orientation of which cannot possibly be detected, such as "A" or "T", may be specified as a particular character, whereby the orientation detection accuracy can be improved. If the character code Cm matches such a particular character code, the process goes to step S57 and subsequent steps.

If the character code Cm is not a particular character code in step S54, the value of Dm corresponding to Km being the maximum value of K1 through K4 is incremented among the variables D1 through D4 for counting the above described correcting methods in step S55. In step S56, whether or not the value of Dm reaches 2. If the value of Dm is 2, it means that the method corresponding to Dm is determined to be a correction method to be executed for obtaining a properly orientated image among the 4 correction methods resultant from the rotation or the flipping to a mirror image for 2 of the extracted input images. The variable that first reaches 2 among D1 through D4 is adopted for all of other characters within the image as a conversion method for a correction. If the value of Dm is determined not to reach 2, the operations in and after step S57 are repeated.

If the value of Dm is determined to reach 2 in step S56, the same conversion method as that for converting the input image E1 to the image Em, namely, the rotation and/or flipping to a mirror image are executed for the input image. The process is then terminated. The reason why the value of Dm is set to 2 as a condition is that an incorrect orientation can possibly be detected if the value of Dm is set to 1, and a processing time increases if the value is 3. However, if precedence is given to the detection accuracy over the processing time, the value of Dm may be set to 3 or more.

In step S59, a document image that is corrected to be a properly orientated image can be obtained by applying to the input image the same conversion method as that for converting the image E1 to the image Em. That is, the image E2 is an image obtained by flipping the image E1 to a mirror image if "m" equals 2, and a properly orientated image can be obtained by flipping the input image to a mirror image. Additionally, since the image E3 is an image obtained by rotating the image E1 by 180 degrees if "m" equals 3, a properly orientated image can be obtained by rotating the input image by 180 degrees. If "m" equals 4, the image E4 is an image obtained by rotating the image E1 by 180 degrees, and by flipping the rotated image to a mirror image. Therefore, a properly orientated image can be obtained by rotating the input image, and by flipping the rotated image back from the mirror image. Because the input image or the image after being rotated by 90 degrees is a properly orientated image if "m" equals 1, there is no need to perform conversion for a correction. Note that if the line orientation is vertical, the character image E1 is rotated by 90 degrees in step S45. Therefore, the rotation must be performed by 90 degrees corresponding to this rotational angle regardless of "m" in step S59.

If "j" and "N" become equal in step S58, the detection process is terminated. This means that the process is aborted so as not to take a processing time too long if the proper orientation is uneasy to be detected from a character image. With the above described process, an input English document image is automatically corrected to be a properly orientated image.

Figure 14:
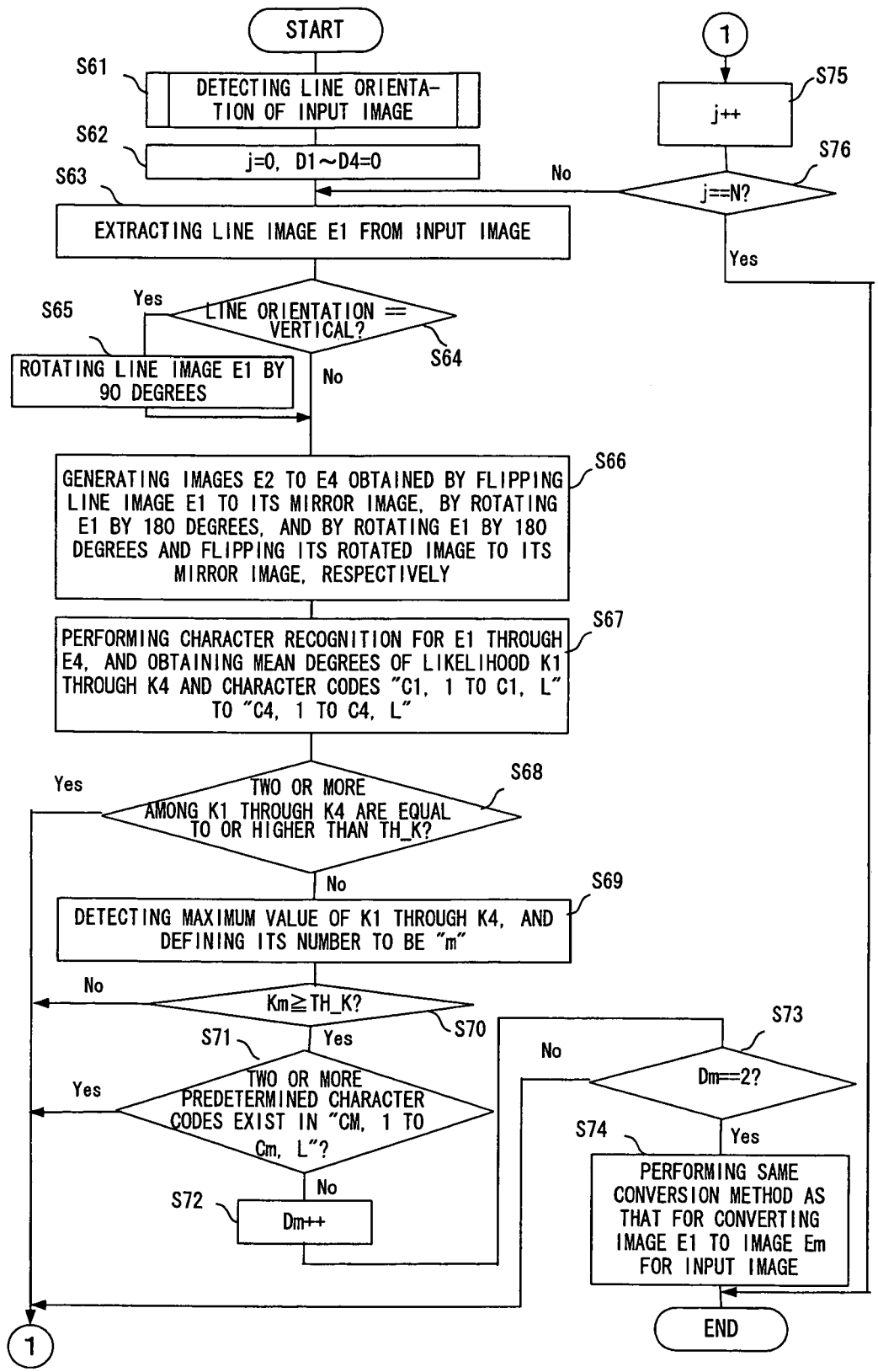
FIG. 14 is a flowchart showing the details of the process for automatically correcting a document image to be a properly orientated image by extracting a line image.

FIG. 14 is a flowchart showing the process for automatically correcting a document image to be a properly orientated image in units of lines by extracting the whole or part of a line from an English document image, and by detecting whether or not to require a rotation, a rotational angle if the rotation is required, and mirror image flipping, which are intended for correcting a document image to be properly orientated. This flowchart are mainly the processes performed by the document orientation detecting unit 14 and the image correcting unit 15, which are shown in FIG. 2, and corresponds to step S3 of FIG. 7.

In this flowchart, "j" indicates the number of line images extracted to be used for orientation detection, E1 is an image that is extracted from an input image, and E2 through E4 are images that are respectively obtained by flipping E1 to a mirror image, by rotating E1 by 180 degrees, and by rotating E1 by 180 degrees and flipping the rotated image to a mirror image. K1 through K4 are mean values of the degrees of likelihood for the respective line images E1 through E4, which are obtained by performing character recognition for pluralities of characters within the respective line images E1 through E4. "L" is the number of characters simply obtained by performing character recognition for the line images. Character codes that are obtained by performing the character recognition for the characters within the line images E1 through E4 are respectively represented by "C1, 1 to C1, L", "C2, 1 to C2, L", "C3, 1 to C3, L", and "C4, 1 to C4, L". "D1" to "D4" are the same variables used in FIG. 12. "N" indicates the number of extracted line images, according to which the detection must be aborted.

The fundamental process flow is the same as that in FIG. 12 except that the process is performed in units of line images in FIG. 14, while the orientation detection process is performed in units of character images in FIG. 12. Contents of the steps, which are different from those in FIG. 12, are explained below.

In step S63, the whole or part of one line is extracted from an input document image as a line image, and the extracted line image is defined to be E1. In step S65, the line image E1 is rotated by 90 degrees if the line orientation is vertical.

In step S66, on the basis of the input line image or the image E1 obtained by rotating the input line image by 90 degrees, an image E2 obtained by flipping E1 to a mirror image, an image E3 obtained by rotating E1 by 180 degrees, and an image E4 obtained by rotating E1 by 180 degrees and flipping the rotated image to a mirror image are generated.

In step S67, character recognition is performed for the characters within the line images E1 through E4. Since each of the line images includes a plurality of character images, the mean degrees of likelihood K1 through K4 are obtained for the respective line images E1 through E4. Additionally, character codes "C1, 1 to C1, L", "C2, 1 to C2, L", "C3, 1 to C3, L", and "C4, 1 to C4, L" are obtained for the respective line images.

The following process is the same as that in FIG. 12. For example, in step S71, it is detected whether or not 2 or more character codes corresponding to predetermined characters, for example, "A", "T", and the like are included in the character codes "Cm, 1 to Cm, and L" within the line image Em having the highest mean degree of likelihood. If 2 or more character codes corresponding to predetermined characters are included, the process goes to step S75. If 2 or more character codes are not included, the process goes to step S72. By continuing such a process, an input English document image is automatically corrected.

If the mean degree of likelihood of an image obtained by rotating an input line image or by flipping the input line image to a mirror image is low, many characters that are not correctly recognized may be included, and there is a strong possibility that a correct orientation cannot be detected. Accordingly, if all of the mean degrees of likelihood of the respective images E1 through E4 are lower than a predetermined threshold value, the orientation is not detected from the corresponding line images.

Furthermore, orientation is not detected from corresponding lines also if there are plural number of the mean degrees of likelihood, which exceed the predetermined threshold value. These are the same as those in FIG. 12.

The above provided explanation refers to the preferred embodiments according to the present invention by targeting a document image the text of which is not written vertically in normal cases such as an English document image. However, if a user manually switches a document image correcting device, and targets a document image such as an English document, it is also possible to perform the rotation and character recognition processes by targeting only the 4 patterns among the 8 patterns shown in FIG. 4, and to perform the rotation and recognition processes by targeting all of the 8 patterns shown in FIG. 4 when targeting a document image in a language that is also written vertically, for example, a document image in Japanese represented by Chinese characters and kana.

Explained last is the loading of a program into a computer, which is intended to implement the document image correcting device as a computer system, in the preferred embodiments according to the present invention. Programs recited in claims 16 and 17 of the present invention, and the flowcharts shown in FIGS. 7, 8, 11, 12, and 14 are stored, for example, in a memory 25 such as a RAM, a hard disk, etc. of a computer 21. The programs are executed by a main body 24, so that the document image correcting device according to the present invention is implemented.

The programs for implementing the document image correcting device according to the present invention may be loaded into the computer 21 from a program provider side via a line 32, or may be stored in a portable storage medium 22 which is normally distributed, and loaded by the computer 21, so that the programs can be executed.

As the memory 25, for example, a ROM, a magnetic disk, an optical disk, a magneto-optical disk, etc. may be used. As the portable storage medium, an arbitrary computer-readable storage medium such as a memory card, a floppy disk, a CD-ROM, an optical disk, a magneto-optical disk, etc. may be used.

The distinguished features of the present inventions are listed below.

(1) The character image extracting unit according to the present invention selects and extracts a character image the black pixel ratio of which is within a predetermined range.

(2) The character image extracting unit selects and extracts a character image the ratio of a long side to a short side of which is within a predetermined range.

(3) The character orientation detecting unit detects as a properly orientated character image the image having the highest degree of likelihood of the recognition made by the character recognizing unit among the images to which the image converting unit converts an extracted character image with different conversion methods, and detects whether or not to require the rotation, the rotational angle from the properly orientated character image to the input image if the rotation is required, and the mirror image flipping.

(4) The character orientation detecting unit detects only one image as a properly orientated image, if there is the only one image having a predetermined or higher degree of likelihood of the recognition made by the character recognizing unit among the images to which the image converting unit converts an extracted character image with different conversion methods, and detects whether or not to require the rotation, the rotational angle if the rotation is required, and the mirror image flipping.

(5) The character orientation detecting unit detects as a properly orientated image the image which has the highest degree of likelihood of the recognition made by the character recognizing unit, and a character code corresponding thereto, which is not a predetermined character code, among the images to which the image converting unit converts an extracted character image with different conversion methods, and detects whether or not to require the rotation, the rotational angle from the properly orientated image to the input image if the rotation is required, and the mirror image flipping.

(6) The character orientation detecting unit detects as a properly orientated image an image type, which has the highest mean degree of likelihood of the recognition made by the character recognizing unit for character images within a line image among the image types to which the image converting unit converts the character images within the line image with different conversion methods, and detects whether or not to require the rotation, the rotational angle from the properly orientated image to the input document image if the rotation is required, and the mirror image flipping.

(7) The character orientation detecting unit detects as a properly orientated image only one image type if there is the only one image type having the mean degree, which exceeds a predetermined value, of the likelihood of the recognition made by the character recognizing unit for character images within a line image, and detects whether or not to require the rotation, the rotational angle from the properly orientated image to the input document image if the rotation is required, and the mirror image flipping.

As described above, according to the present invention, by using the fact that the line orientation of, for example, an English document is horizontal only, the number of detection orientations of a character is reduced to one half of that of a Japanese character, an English character image is extracted according to the feature of the character image, and character recognition is used, so that the orientation of the document image can be detected with high accuracy. Therefore, even if an English document is scanned in any of upward, downward, right, and left directions with a hand-held scanner, the input image can be automatically corrected to be a properly orientated image by correctly detecting the orientation of the document image. This significantly contributes to the operability of the document image correcting device, and the improvement of a user interface.

While the invention has been described with reference to the preferred embodiments thereof, various modifications and changes may be made to those skilled in the art without departing from the true spirit and scope of the invention as defined by the claims thereof.

What is claimed is:

1. A document image correcting device correcting an input document image to be a properly orientated image, comprising:
    a line orientation determining unit determining whether a line orientation of an input document image is either vertical or horizontal;
    a character image extracting unit extracting a character image from the input document image;
    a character recognizing unit performing recognizing on the extracted character image;

a character orientation detecting unit detecting whether or not to require a rotation, a rotational angle if the rotation is required, and mirror image flipping, which are intended for correcting the character image extracted by said character image extracting unit to be properly orientated, in correspondence with a result of a determination made by said line orientation determining unit; and a document image correcting unit correcting the input document image to be a properly orientated document image based on a result of detection made by said character orientation detecting unit; wherein said character orientation detecting unit detects as a properly orientated character image an image having a highest degree of likelihood of the recognition performed by said character recognizing unit among the images to which said image converting unit converts the extracted character image with different conversion methods, and detects whether or not to require the rotation, the rotational angle from the properly orientated image to the input image if the rotation is required, and the mirror image flipping;

if there is only one image having a predetermined or higher degree of likelihood of the recognition performed by said character recognizing unit among the images to which said image converting unit converts the extracted character image with different conversion methods, said character orientation detecting unit detects the only one image as a properly orientated image, and detects whether or not to require the rotation, the rotational angle from the properly orientated image to the input image if the rotation is required, and the mirror image flipping; and said character orientation detecting unit detecting unit detects as a properly orientated image an image that has a highest degree of likelihood of the recognition performed by said character recognizing unit, and a character code which correspond to the image and is not predetermined, among the images to which said image converting unit converts the extracted image with different conversion methods, and detects whether or not to require the rotation, the rotational angle from the properly orientated image to the input image if the rotation is required, and the mirror image flipping.

2. The document image correcting device according to claim 1, wherein:

said character orientation detecting unit further comprises an image converting unit converting the character image extracted by said character image extracting unit by rotating the character image, and/or by flipping the character image to a mirror image, and the character recognizing unit performing character recognition for the character image converted by said image converting unit, and outputting a character code and a degree of likelihood of the recognition; and it is detected whether or not to require the rotation, the rotational angle if the rotation is required, and the mirror image flipping, which are intended for correcting the extracted character image to be properly orientated, based on a result of the recognition performed by said character recognizing unit.

3. The document image correcting device according to claim 1, further comprising a language identifying unit identifying a language of the input document image, wherein the input document image is corrected to be a properly orientated image in correspondence with a result of identification made by said language identifying unit.

4. The document image correcting device according to claim 1, wherein said character image extracting unit selects and extracts a character image a black pixel ratio of which is within a predetermined range.

5. The document image correcting device according to claim 1, wherein said character image extracting unit selects and extracts a character image a ratio of a long side to a short side of which is within a predetermined range.

6. A document image correcting device correcting an input document image to be a properly orientated image, comprising:

a line orientation determining unit determining whether a line orientation of an input document image is either vertical or horizontal;

a line image extracting unit extracting a whole or a part of a line from the input document image as a line image;

a character image recognizing unit performing recognizing on an extracted character image;

a character orientation detecting unit detecting whether or not to require a rotation, a rotational angle if the rotation is required, and mirror image flipping, which are intended for correcting a character image within the line image extracted by said line image extracting unit, in correspondence with a result of a determination made by said line orientation determining unit; and a document image correcting unit correcting the input document image to be a properly orientated image based on a result of detection made by said character orientation detecting unit; wherein said character orientation detecting unit detects an image type as a properly oriented image if the image type has a highest mean degree of likelihood of the recognition performed by said character image recognizing unit for the character image within the line image among image types to which said image converting unit convert the character image within the line image with different conversion methods, and if a preset number or more of predetermined character codes are not included among character codes corresponding to the character image within the line image, and detects whether or not to require the rotation, the rotational angle from the properly orientated image to the input document image if the rotation is required, and the mirror image flipping;

said character orientation detecting unit detects as a properly orientated character image an image type having a highest mean degree of likelihood of the recognition performed by said character recognizing unit for the character image within the line image among image types to which said image converting unit converts the extracted character image with different conversion methods, and detects whether or not to require the rotation, the rotation angle from the properly orientated image to the input document image if the rotation is required, and the mirror image flipping; and said character orientation detecting unit detects only one image type as a properly orientated image if there is the only one image type having a predetermined or higher mean degree of likelihood of the recognition performed by said character recognizing unit for the character image within the line image among image types to which said image converting unit converts the extracted character image with different conversion methods, and detects whether or not to require the rotation, the rotational angle from the properly orientated image to the input document image if the rotation is required, and the mirror image flipping.

7. The document image correcting device according to claim 6, wherein:

said character orientation detecting unit further comprises an image converting unit rotating the character image within the line image extracted by said line image extracting unit, and/or flipping the character image to a mirror image in correspondence with a result of a determination made by said line orientation determining unit, and the character image recognizing unit performing character recognition for the character image converted by said image converting unit, and outputting a character code corresponding to each character image within the line image, and a degree of likelihood of the recognition; and it is detected whether or not to require the rotation, the rotational angle if the rotation is required, and the mirror image flipping, which are intended for correcting the character image within the line image extracted by said line image extracting unit to be properly orientated, based on a result of the recognition performed by said character recognizing unit.

8. A document image correcting device correcting an input document image to be a properly orientated image, comprising:

a line orientation determining unit determining whether a line orientation of an input document image is either vertical or horizontal;

a character image extracting unit extracting a character image from the input document image;

a character image recognizing unit performing recognizing on the extracted character image;

a character orientation detecting unit excluding some of a plurality of patterns that include a pattern of the character image within the input document image, and patterns obtained by rotating the character image and/or by flipping the character image to a mirror image, and detecting whether or not to require a rotation, a rotational angle if the rotation is required, and mirror image flipping, which are intended for correcting the character image extracted by said character image extracting unit to be properly orientated, with the use of remaining patterns; and a document image correcting unit correcting the input document image to be a properly orientated document image based on a result of detection made by said character orientation detecting unit; wherein said character orientation detecting unit detects an image type as a properly orientated image if the image type has a highest mean degree of likelihood of the recognition performed by said character image recognizing unit for the character character with different conversion methods, and if a preset number or more of predetermined character codes are not included among character codes corresponding to the character image with the line image, and detects whether or not to require the rotation, the rotational angle from the properly orientated image to the input document image if the rotation is required, and the mirror image flipping;

said character orientation detecting unit detects as a properly orientated character image.

9. A document image correcting method correcting an input document image to be a properly orientated image, comprising:

determining whether a line orientation of the input document image is either vertical or horizontal;

detecting whether or not to require a rotation, a rotational angle if the rotation is required, and mirror image flipping, which are intended for correcting a character image extracted from the input document image to be properly orientated, in correspondence with a result of a determination; and correcting the input document image to be a properly orientated document image based on a result of detection; wherein detecting an image type as a properly orientated image if the image type has a highest mean degree of likelihood of the recognition for the character image within the line image among types which are converted using the character image within the line image with different conversion methods, and if a preset number or more of predetermined character codes are not includes among character codes corresponding to the character image within the line image, and detects whether or not to require the rotation, the rotational angle from the properly orientated image to the input document image if the rotation is required, and the mirror image flipping;

detecting as a properly orientated character image an image type having a highest mean degree of likelihood of the recognition performed for the character image within the line image among image types which are converted using the extracted character image with different conversion methods, and detects whether or not to require the rotation, the rotational angle from the properly orientated image to the input document image if the rotation is required, and the mirror image flipping; and detecting only one image type as a properly orientated image if there is the only one image type having a predetermined or higher mean degree of likelihood of the recognition performed for the character image within the line image among image types which are converted using the extracted character image with different conversion methods, and detects whether or not to require the rotation, the rotational angle from the properly orientated image to the input document image if the rotation is required, and the mirror image flipping.

10. A computer-readable storage medium for use in a document image correcting device correcting an input document image to be a properly orientated image, on which is recorded a program for causing a computer to perform a process, said process comprising:

determining whether a line orientation of the input document image is either vertical or horizontal;

detecting whether or not to require a rotation, a rotational angle if the rotation is required, and mirror image flipping, which are intended for correcting a character image extracted from the input document image to be properly orientated, in correspondence with a result of a determination; and correcting the input document image to be a properly orientated document image based on a result of detection; wherein detecting an image type as a properly orientated image if the image type has a highest mean degree of likelihood of the recognition for the character image within the line image among types which are converted using the character image within the line image with different conversion methods, and if a preset number or more of predetermined character codes are not includes among character codes corresponding to the character image within the line image, and detects whether or not to require the rotation, the rotational angle from the properly orientated image to the input document image if the rotation is required, and the mirror image flipping;

detecting as a properly orientated character image an image type having a highest mean degree of likelihood of the recognition performed for the character image within the line image among image types which are converted using the extracted character image with different conversion methods, and detects whether or not to require the rotation, the rotational angle from the properly orientated image to the input document image if the rotation is required, and the mirror image flipping; and detecting only one image type as a properly orientated image if there is the only one image type having a predetermined or higher mean degree of likelihood of the recognition performed for the character image within the line image among image types which are converted using the extracted character image with different conversion methods, and detects whether or not to require the rotation, the rotational angle from the properly orientated image to the input document image if the rotation is required, and the mirror image flipping.

11. A document image correcting device correcting an input document image to be a properly orientated image, comprising:

line orientation determining means for determining whether a line orientation of an input document image is either vertical or horizontal;

character image extracting means for extracting a character image from the input document image;

a character image recognizing means for performing recognizing on the extracted character image;

character orientation detecting means for detecting whether or not to require a rotation, a rotational angle if the rotation is required, and mirror image flipping, which are intended for correcting the character image extracted by said character image extracting means to be properly orientated, in correspondence with a result of a determination made by said line orientation determining means; and document image correcting means for correcting the input document image to be a properly orientated document image based on a result of detection made by said character orientation detecting means; wherein said character orientation detecting means detects an image type as a properly oriented image if the image type has a highest mean degree of likelihood of the recognition performed by said character image recognizing means for the character image within the line image among image types to which said image converting means convert the character image within the line image with different conversion methods, and if a preset number or more of predetermined character codes are not included among character codes corresponding to the character image within the line image, and detects whether or not to require the rotation, the rotational angle from the properly orientated image to the input document image if the rotation is required, and the mirror image flipping;

said character orientation detecting means detects as a properly orientated character image an image type having a highest mean degree of likelihood of the recognition performed by said character recognizing means for the character image within the line image among image types to which said image converting means converts the extracted character image with different conversion methods, and detects whether or not to require the rotation, the rotation angle from the properly orientated image to the input document image if the rotation is required, and the mirror image flipping; and said character orientation detecting means detects only one image type as a properly orientated image if there is the only one image type having a predetermined or higher mean degree of likelihood of the recognition performed by said character recognizing means for the character image within the line image among image types to which said image converting unit converts the extracted character image with different conversion methods, and detects whether or not to require the rotation, the rotational angle from the properly orientated image to the input document image if the rotation is required, and the mirror image flipping.

* * * * *

UNITED STATES PATENT AND TRADEMARK OFFICE
CERTIFICATE OF CORRECTION

PATENT NO.      : 7,151,860 B1
APPLICATION NO. : 09/612288
DATED           : December 19, 2006
INVENTOR(S)     : Kenichiro Sakai Page 1 of 1

It is certified that error appears in the above-identified patent and that said Letters Patent is hereby corrected as shown below:

Col. 17, line 35 (Approx.), delete "detecting unit" second occurrence

Col. 19, line 56 (Approx.), after "for the character", insert --image within the line image--

Col. 19, line 58 (Approx.) delete "character" second occurrence

Signed and Sealed this

Tenth Day of April, 2007

JON W. DUDAS
*Director of the United States Patent and Trademark Office*